June 4, 1968 R. A. EVANS ETAL 3,386,291

FLUID VORTEX APPARATUS

Filed Sept. 30, 1965 2 Sheets-Sheet 1

INVENTORS
RICHARD A. EVANS
HARVEY D. OGREN
BY
ATTORNEY

INVENTORS
RICHARD A. EVANS
HARVEY D. OGREN
BY
ATTORNEY

United States Patent Office 3,386,291
Patented June 4, 1968

3,386,291
FLUID VORTEX APPARATUS
Richard A. Evans, Columbia Heights, and Harvey D. Ogren, Roseville, Minn., assignors to Honeywell Inc., Minneapolis, Minn., a corporation of Delaware
Filed Sept. 30, 1965, Ser. No. 491,776
3 Claims. (Cl. 73—505)

ABSTRACT OF THE DISCLOSURE

Apparatus having a foil element extending completely across a passage in an edgewise manner so that fluid flow having a component not parallel to said foil element produces a differential pressure signal.

---

This invention pertains to vortex amplifiers and, more particularly, to pickoff means for vortex rate sensors.

A vortex rate sensor is a vortex amplifier used as a fluid sensing device to sense angular velocity about an input axis and provide a signal which is proportional to that angular velocity. The vortex rate sensor employs a fluid flow field, within a cylindrical chamber, which closely approximates the classical two dimensional pure sink flow. If the vortex rate sensor is subject to a rate (angular velocity) input about its sensitive axis, a vortex flow having tangential velocity is superimposed upon the sink flow field. The superimposing of the vortex flow field upon the sink flow field results in a flow field in which the fluid streamlines within the vortex rate sensor chamber approximate a logarithmic spiral. The fluid then exhausts through a sink in a helical flow pattern. A pickoff is located in the sink outlet passage of the vortex rate sensor to sense angular velocity.

In order to obtain useful information from the vortex rate sensor it is necessary to have a pickoff suitable for sensing any rotation of the vortex sensor about its axes. There are pickoffs capable of sensing a rate such as that disclosed in the co-pending application Ser. No. 156,613, filed Dec. 4, 1961, in the name of Richard J. Reilly (now Patent 3,340,737) and assigned to the same assignee as the present application.

The applicants have provided a new and unique pickoff means for sensing the effect of a rate input upon the fluid flow field of a vortex rate sensor. More specifically, the applicants have provided a foil element in the outlet passage of the vortex rate sensor.

The applicants' invention is an improvement over the prior art pickoffs since it is structurally simpler than prior art pickoffs and consequently easier to manufacture. The applicants' invention provides an output signal having a lower noise because the pickoff can now be made thinner than prior art pickoffs, resulting in less obstruction to fluid flow and hence less turbulence. In addition, the invention provides for substantially eliminating a portion of the null bias inherent in vortex rate sensors, by use of multiple pressure ports. It is these improvements over prior art pickoffs of vortex rate sensors which have made applicants' invention a useful, compact, and low cost device to use in fluid systems.

For a better understanding of the invention, reference may be had to the following detailed description taken in conjunction with the accompanying figures of the drawing, in which.

Figure 1:
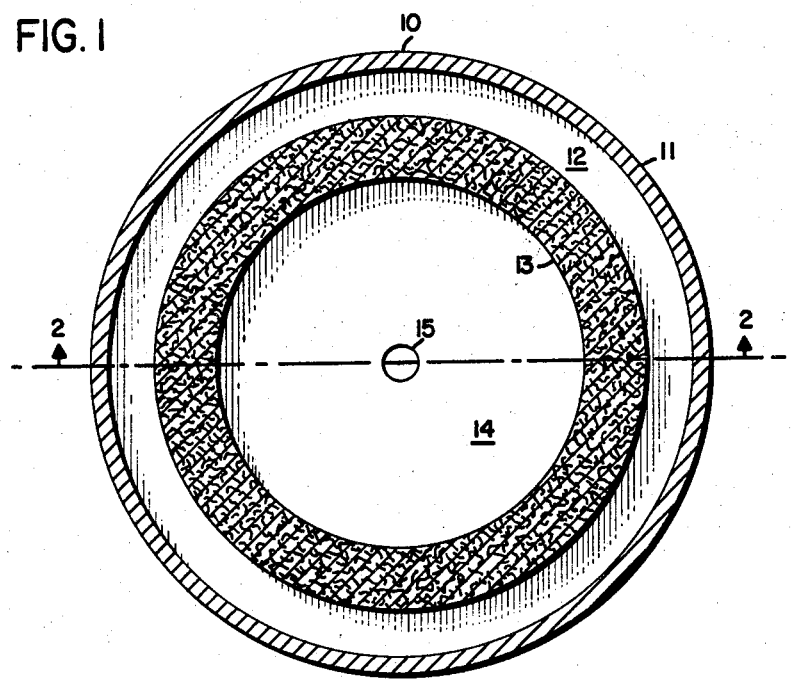
FIGURE 1 is a top view of one embodiment of a vortex rate sensor.
Figure 2:
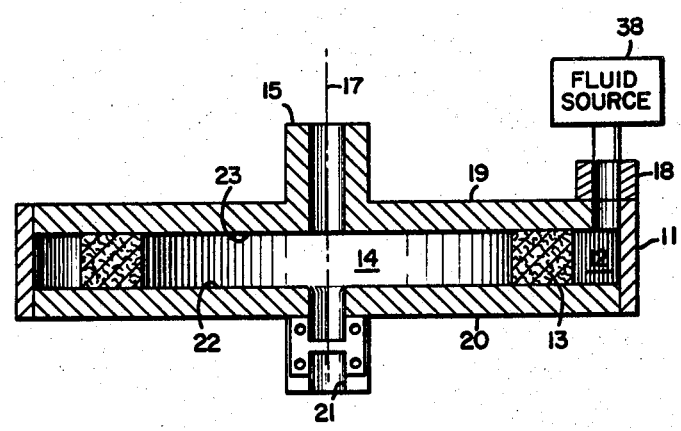
FIGURE 2 is a cross sectional view taken along line 1—1 of FIGURE 1.

Referring to FIGURES 1 and 2, reference numeral 10 designates a vortex rate sensor. A cylindrical tubular element 11 is provided to form an outer boundary of the vortex rate sensor. Immediately adjacent to element 11 is an annular or ring-like manifold 12, which serves to disperse a fluid uniformly around the periphery of sensor 10. A ring-shaped or annular sintered porous coupling member 13 forms the inner boundary of the manifold 12. Thus, cylindrical tubular element 11 and porous coupling member 13 collectively define the radial boundaries of manifold 12. In the central portion of sensor 10 is located a cylindrical vortex chamber 14 which has its outer boundary defined by porous coupling member 13. Centrally located in the vortex rate sensor 10 are sink exit passages 15 and 21.

Reference numeral 17 identifies the axis about which angular rate is sensed. Fluid can enter annular manifold 12 through a circular or annular ingress passage 18 which is connected to a fluid source 38. The ingress passage 18 traverse to flat cylindrical plate 19 which defines the top boundary of sensor 10. Similarly, a flat cylindrical plate 20 defines the bottom boundary of sensor 10. The two boundary elements 19 and 20 have plane surfaces 23 and 22 respectively. Thus, the boundaries of chamber 14 are collectively defined by plate elements 19 and 20 axially and by porous coupling member 13 in the radial direction.

Figure 3:
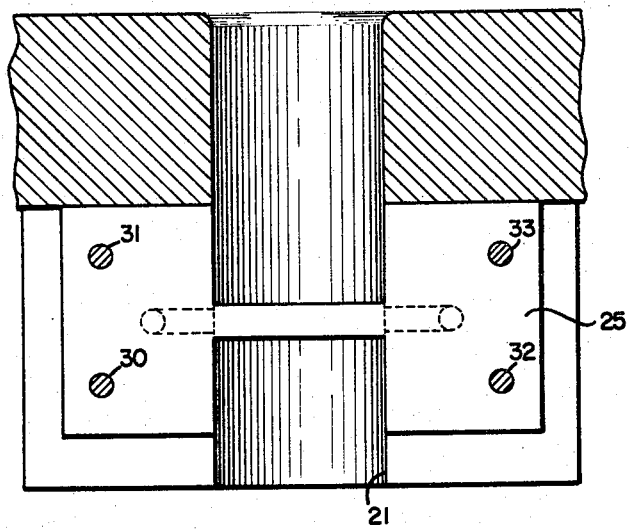
FIGURE 3 is an enlarged view of a portion of FIGURE 2.
Figure 4:
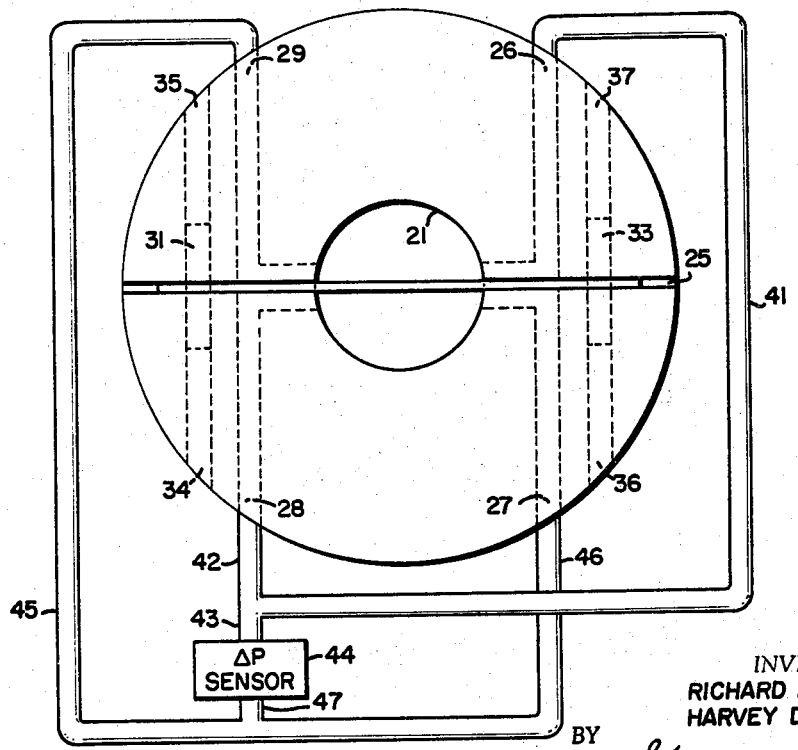
FIGURE 4 is an end view of the outlet passage of the vortex rate sensor.

Referring to FIGURES 3 and 4, it will be noted there is a substantially plane H-shaped pickoff foil element 25 having the horizontal bar of the pickoff extending across exit passage 21, the plane of the H containing axis 17. The selection of the H shape for the pickoff is not significant since only the bar portion of the H is used. It is thus obvious that a rectangular shaped or any other shaped pickoff could be used as long as it had a member extending across the exit passage 21. It is this foil element 25 which has offered improvement over prior art pickoffs not by its sophistication or complexity but by its simple structure.

Reference numerals 26, 27, 28, and 29 denote static pressure ports for measuring the pressure on each side of the foil element.

Pins for fastening pickoff 25 to the rate sensor are denoted by numerals 30-33. These may be dowel pins or screws or any other suitable means for fastening two objects together. Locating holes for the pins are denoted by numerals 34-37. Fluid conduits 41 and 42, connected to ports 26 and 28 respectively join to form a fluid conduit 43, which supplies a first input signal to a differential pressure sensor 44. Similarly fluid conduits 45 and 46, connected to ports 29 and 27 respectively join to form conduit 47 which supplies a second signal to a differential pressure responsive device 44.

Referring now to FIGURES 1-4, a description of the flow field within the vortex rate sensor is as follows. Fluid particles flow from fluid source 38, through ingress passage 18 into annular manifold 12, and are dispersed uniformly around porous coupling member 13. The fluid particles then flow radially through member 13 to vortex chamber 14 and converge in the central core region of the vortex rate sensor. Upon converging in the central core region of the vortex rate sensor, the fluid particles must change direction of travel and flow perpendicular to the radial direction and parallel to axis 17 in exit passages 15 and 21. When a rate is applied to the vortex rate sensor, the fluid particles leave porous coupling member 13 with an imparted tangential velocity and follow a logarithmic spiral into the central core region of the vortex rate sensor. From the central core region of the vortex rate sensor, the fluid particles travel out the exit passage 15 and 21 in a helical flow pattern. With a pickoff located in passage 15 or passage 21 it is possible to measure the amount of swirl in the fluid as it exhausts out the exit passages. With no input rate the fluid flowing in exit passage 21, has only an axial velocity component, that is, the paths the fluid particles travel in flowing through exit passage 21 are all parallel to axis 17 of the sensor 10. It can be appreciated that if the pickoff 25 is located in passage 21 parallel to axis 17, that fluid flows smoothly around the pickoff 25.

As the fluid flows in exit passage 21 a radial outward pressure force is associated with the moving fluid particles. The pressure associated with the moving fluid particles is proportional to the square of the velocity according to Bernoullis classic equation of fluid flow. That is, normally with fluid supplied from a single source. there is a distinct pressure associated with the fluid velocity, and if the fluid velocity past two points is identical the pressure will be identical. Thus, it can be appreciated that when there is no input rate in sensor 10, the fluid particles flow smoothly past the pickoff 25, consequently the velocity of the fluid particles is the same on both sides of the pickoff. Hence, the pressures in the pickoff ports 26, 27, 28, and 29 will all be equal. That is, with no input rate no output differential pressure signal is generated.

Now suppose the sensor 10 is rotated about its axis 17. The fluid particles exhaust through passages 15 and 21 no longer follow paths parallel to axis 17, instead a helical flow pattern exists in the passage 21. In other words, the fluid particles follow a corkscrew like path out exit passage 21. It can be appreciated that the pickoff 25, located substantially parallel to axis 17, cuts across the helical paths the fluid particles are traveling. Since the pickoff 25 is fastened securely in passage 25 the fluid particles must change their direction and flow around the pickoff 25. Consequently, the fluid flowing past foil element 25 accelerates on one portion and decelerates on the other, causing a pressure differential signal, due to the different fluid velocities, in the static pressure ports.

Since the velocities of the fluid particles on opposite sides of the pickoff 25 are different, a pressure differential exists between static pressure ports 26 and 27 and a pressure difference exists between passages 28 and 29. With a greater input rate applied to sensor 10 more swirl or helical flow exists in passage 21. Consequently, the pickoff 25 cuts across more fluid particles' paths, creating a greater differential pressure signal in the static pressure ports, which is sensed by device 44. Because applicant extends his pickoff completely across exit passage 21 of the vortex rate sensor 10, and thereby supports the pickoff in tension, foil element 25 can be made from very thin material. The use of thin material further enables the disturbance to fluid flow in exit passage 21 to be at a minimum. Consequently, the amount of aerodynamic noise or turbulence generated at the foil element is very small. Thus, applicants' invention offers a lower noise pickoff than prior art pickoffs for vortex rate sensors.

Since applicants' foil element is structurally simple it can be fabricated to very small dimensions. For example, it is possible to fabricate a foil element .002 inch in thickness and .040 inch long.

One of the important parameters of a vortex rate sensor is the scale factor, which is a function of two geometric dimensions of the vortex rate sensor; namely, the exit passage radius and the inner coupling radius. The scale factor is defined as a pressure output signal per input turning rate in degrees per second. The scale factor is equal to a constant times $R_a^2/R_i^3$.

$$\left(\text{Scale factor} = K \frac{R_a^2}{R_i^3}\right)$$

where $R_a$ is equal to the coupling member inside radius and $R_i$ equal to the sink outlet radius at the foil element. Thus, it can be appreciated, from the above equation, that a decrease in the sink outlet radius at the foil element will result in an increase scale factor if the coupling inside radius is kept constant. With prior art pickoffs the minimum sink outlet radius, where the pickoff was located, was set by the size of a pickoff that could be economically made. However, with the present invention applicant can make a very small pickoff cheaply and, consequently, can make a very small exit passage to position the pickoff in. It can be appreciated that vortex rate sensors designed for a given scale factor can now be made considerably smaller in size and consequently occupy less volume in a system without any increase in cost.

One of the problems associated with prior art pickoffs was the null bias, which is the differential pressure output signal with zero input rate. Null bias is generally attributed to asymmetries in the vortex rate sensor case and coupling means. In order to use the vortex rate sensor as a sensing device, it is desirable to eliminate null bias with zero input turning rate. For example, if a fluid amplifier is connected to the output of the vortex rate sensor, it can be appreciated that it is not desirable to amplify a null bias signal since this usually causes faster saturation of the fluid amplifier.

It should be pointed out that normally a small amount of bias can be tolerated in a subsequent stage of fluid amplification, but large variations saturate any subsequent stage of fluid amplification. With the present invention, an output signal can be selected from a plurality of pressure outlet ports which give the least null bias signal. For example, applicant can use output ports 28 and 29, or 26 and 27, or 27 and 28, or 26 and 29, or applicant can also select ports 27 and 29 connected together in combination with ports 28 and 26 connected together. Thus, applicant has a choice of one of five sets of output ports to use with a subsequent stage of amplification. Because there are five sets that applicant can use it is possible to select a set of pickoff ports which offers the minimum null bias. This feature greatly reduces the amount of adjusting in impedance matching of fluid devices to the vortex rate sensor.

Additional pressure ports could be located around the foil element as well as fewer pickoff ports. It is also apparent more than one device 44 can be operated by outputs from the pickoff means of the vortex rate sensor by, using various combinations of the ouput ports.

While I have shown and described a specific embodiment of this invention, further modification and improvements will occur to those skilled in the art. I desire it to be understood therefore that this invention is not limited to the particular forms shown and I intend in the appended claims to cover all modifications which do not depart from the spirit and scope of this invention.

We claim:

1. In an apparatus of the class described:
   a cylindrical chamber having ingress and exit means for connecting to a fluid source so that fluid under pressure flows through said chamber and exhausts through said exit means;
   a thin foil member for minimizing turbulence extending completely across said exit means, in an edgewise manner so that fluid flow having a component which is not parallel to an axis of said exit means produces a differential pressure on opposite sides of said foil member; and
   a plurality of pressure ports located within said exit means for obtaining an indication of fluid pressure of the fluid flowing past said foil member, a first set of two of said pressure ports having a first null bias being positioned on different sides of said foil member in said exit means for obtaining a first differential pressure signal indicative of the fluid flowing past one end of said foil member, and a second set of two of said pressure ports having a second null bias being positioned on opposite sides of said foil member and across said exit means from said first set of pressure ports for obtaining a second differential pressure signal indicative of the fluid flowing past the other end of said foil member.

2. In an apparatus of the class described:
   exit means for receiving a fluid under pressure;

a foil member mounted in tension and extending completely across said exit means in an edgewise manner so that fluid flow having a component which is not parallel to said foil member produces a differential pressure on the same side of said foil member;
a plurality of pressure ports located within said exit means, a first set of two of said pressure ports being positioned on the same side of said foil member in said exit means for receiving a first differential pressure signal and a second set of two of said pressure ports being positioned on the opposite side of said foil member for receiving a second differential pressure signal; and
means connecting said first set of said pressure ports to said second set of pressure ports thereby porviding a differential pressure signal.

3. Pickoff means comprising a foil member:
a fluid passage having a longitudinal axis;
means mounting said foil member by both ends edgewise in said fluid passage and extending completely across said passage so as to form two separate conduits in said fluid passage;
a first pressure port located in said passage adjacent to said foil member; and
a second pressure port located on the opposite side of said passage but on the same side of said foil member so that fluid flow having a component which is not parallel to the axis of said passage produces a differential pressure signal between said first pressure port and said second pressure port.

References Cited
UNITED STATES PATENTS

| | | | |
|---|---|---|---|
| 1,681,762 | 8/1928 | Connet | 73—203 |
| 3,276,259 | 10/1966 | Bowles et al. | |
| 3,319,471 | 5/1967 | Hermann | 73—194 X |
| 3,320,815 | 5/1967 | Bowles | 73—194 X |

FOREIGN PATENTS 667,814  10/1938  Germany.

RICHARD C. QUEISSER, *Primary Examiner.*

E. D. GILHOOLY, *Assistant Examiner.*